United States Patent [19]

Mizukami et al.

[11] 4,389,678
[45] Jun. 21, 1983

[54] DIGITAL TIME-BASE CORRECTOR FOR SPECIAL MOTION REPRODUCTION BY HELICAL-SCAN VTR

[75] Inventors: Mineo Mizukami; Tatsuo Konishi, both of Tokyo, Japan

[73] Assignee: Nippon Electric Co., Ltd., Tokyo, Japan

[21] Appl. No.: 194,654

[22] Filed: Oct. 6, 1980

[30] Foreign Application Priority Data

Oct. 5, 1979 [JP] Japan ................................ 54-129181
Oct. 5, 1979 [JP] Japan ................................ 54-129182

[51] Int. Cl.³ ............................................ H04N 5/785
[52] U.S. Cl. .................................. 360/10.3; 360/36.2
[58] Field of Search ............... 360/10, 36, 10.3, 36.1, 360/36.2; 358/8, 19, 312, 320, 324, 325, 326

[56] References Cited

U.S. PATENT DOCUMENTS 4,165,524 8/1979 Ninomiya ............................... 360/36
4,214,262 7/1980 Mizukami ............................ 358/8 X
4,249,198 2/1981 Ito et al. ............................... 358/8 X
4,287,529 9/1981 Tatami et al. .......................... 358/8

Primary Examiner—Bernard Konick
Assistant Examiner—Donald McElheny, Jr.
Attorney, Agent, or Firm—Sughrue, Mion, Zinn, Macpeak and Seas

[57] ABSTRACT

A time base corrector (TBC) for a special-motion video reproduction system employing a helical-scan VTR generates write-in address data synchronized to the reproduced digital data and stores the digital data in a digital memory in accordance with the generated write-in address. When the reproducing head jumps vertically, i.e. perpendicular to the data track, the currently-generated write-in address is latched. In response to a reference signal, the latched data is transferred to a read-out address counter for generating a read-out line address, and the stored video signal is then read out of the digital memory under control of the read-out address data.

7 Claims, 16 Drawing Figures

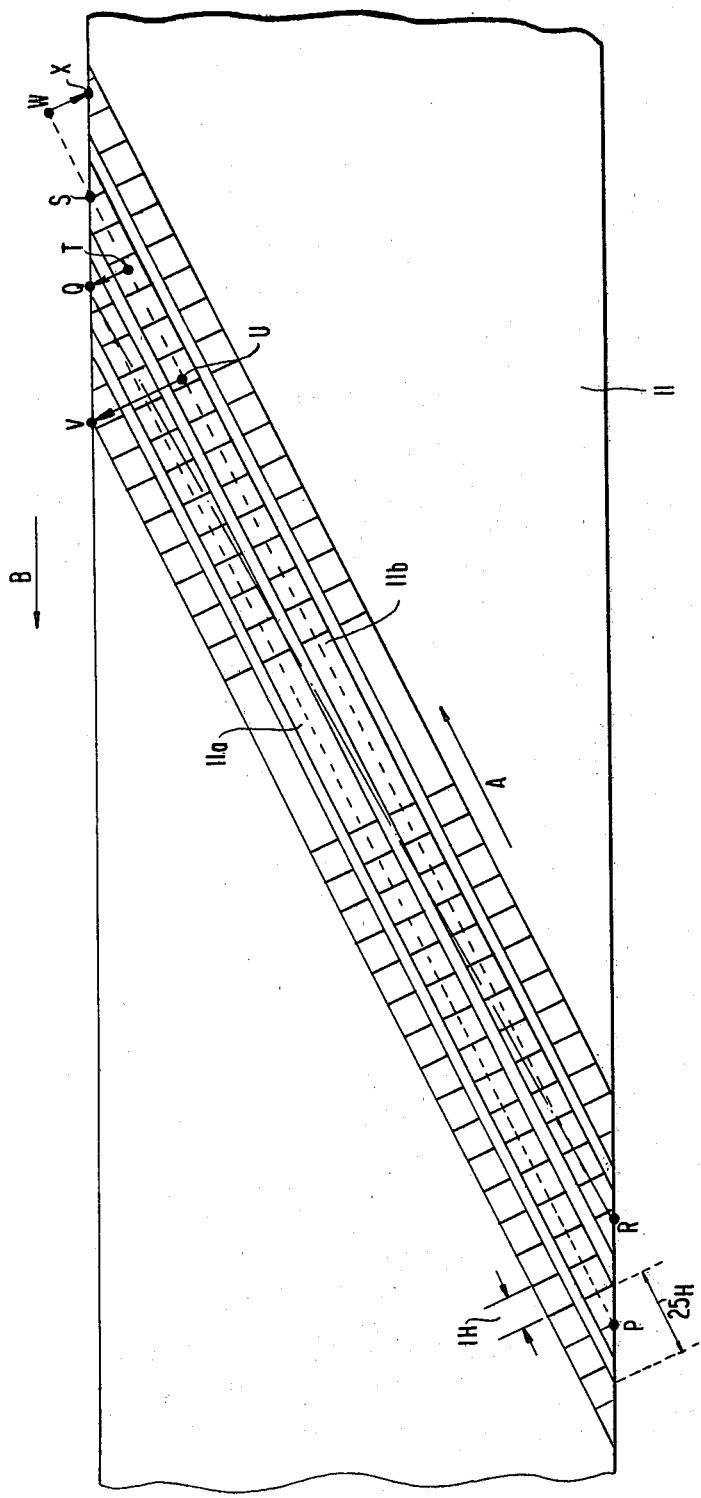

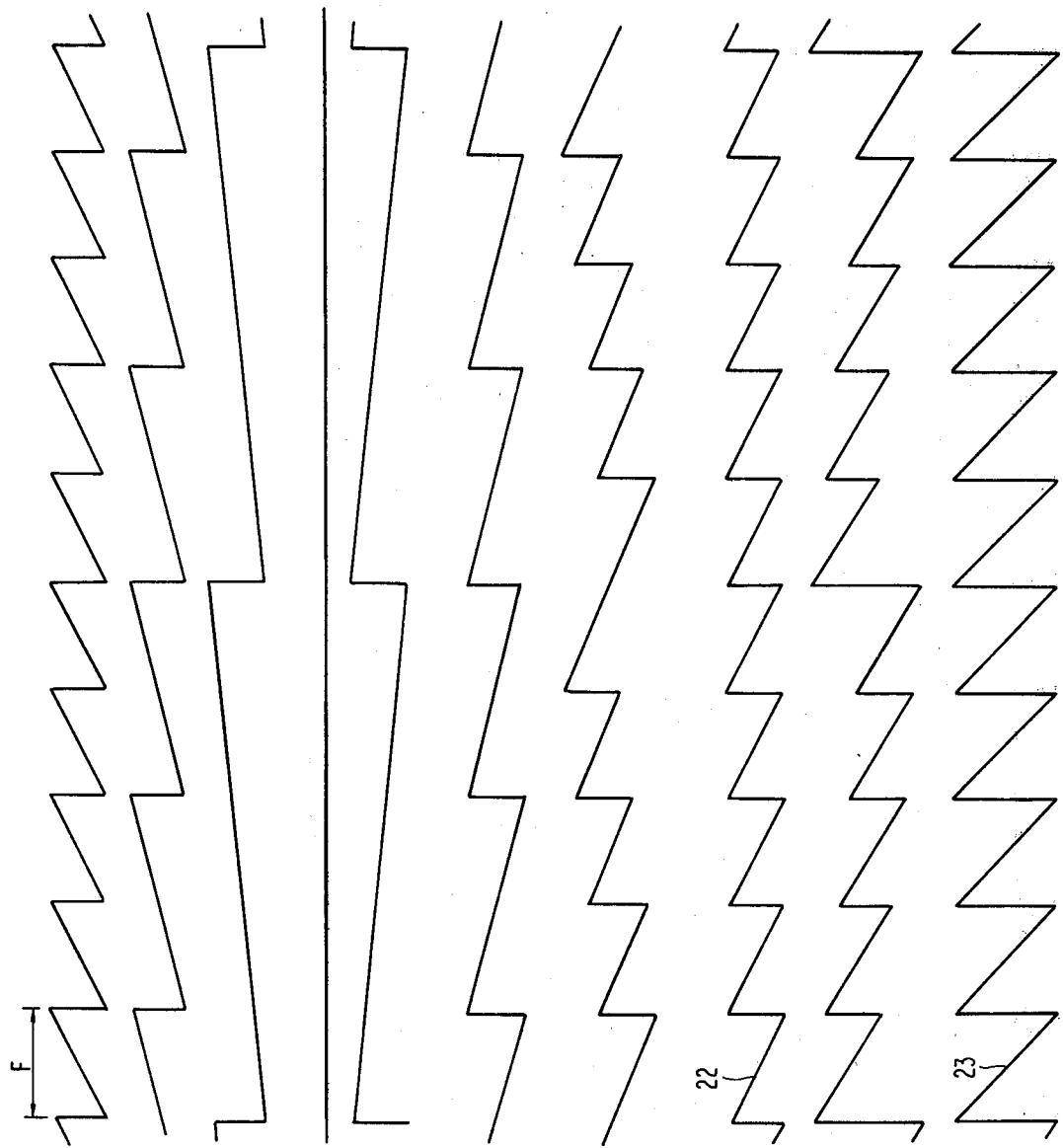

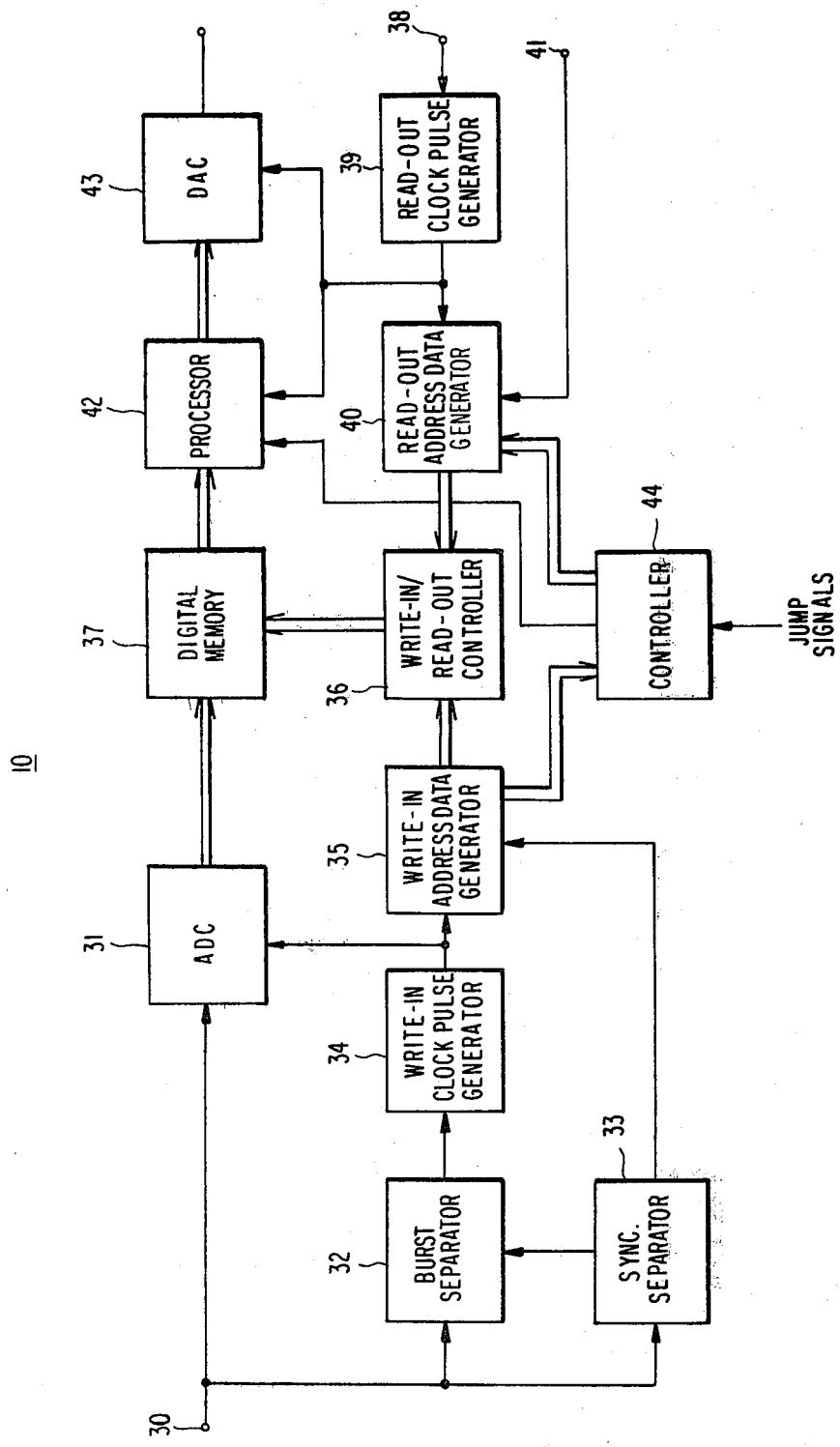

DIGITAL TIME-BASE CORRECTOR FOR SPECIAL MOTION REPRODUCTION BY HELICAL-SCAN VTR

BACKGROUND OF THE INVENTION

This invention relates to a reproduction system for producing special-motion effects, such as slow motion, quick motion, still motion and other effects, in television video signals reproduced by a helical-scan video tape recorder player (VTR) with reproduction tape speed being different than recording tape speed, and more particularly to a digital time-base corrector for such a reproduction system.

Several systems have been proposed to record and/or reproduce television video signals on a magnetic tape. One system is the helical-scan video tape recorder (VTR) wherein a tape wrapped around a drum, including a rotary head, is transported to form video tracks or recorded paths of video signals on the tape diagonally with respect to the longitudinal direction of the tape. Such systems are widely used by consumers, industry, and by television professionals in broadcasting stations.

In the helical VTR, a video signal of one or more fields is usually recorded on a single video track, and the VTR rotary head is rotated in synchronism with a vertical synchronizing signal to accomplish recording of the input video signal. Hereinafter, each video track is assumed to contain one field of a television video signal. However the scope of the instant invention is not limited to such case as will be apparent from the following discussion.

In the case where the video signal of one field is recorded on one video track, the rotation of the rotary head is controlled so that the vertical blanking portion of the television video signal is recorded on one portions of each video track (the margin of the tape). In a single-head helical VTR wherein the television video signal is recorded by a single rotary head, the rotation of the single rotary head is controlled so as to rotate one revolution in one field period. In a dual-head helical VTR, wherein the television video signal is recorded by two rotary heads disposed apart from each other by 180°, the rotation of the rotary heads is controlled so as to rotate half revolution in one field period. Control of the rotary heads is accomplished by phase-comparing a tachometer signal, representing the rotating phase of the rotary head, and a vertical synchronizing signal for the television video signal to be recorded. Accordingly, the vertical synchronizing signal, for the television video signal to be recorded, maintains a predetermined phase relationship with the tachometer signal in the record mode.

For reproducing the recorded video signal, the rotary head is controlled so as to rotate at a predetermined rotational speed in synchronism with a synchronizing signal being supplied from a reference sync generator or other reference signals. In normal reproduction, wherein the tape is transported at normal tape speed, equal to the tape speed at which it was recorded, the running phase of the tape is controlled by controlling the rotation of the tape drive capstan. This is done so that the rotary head follows the center of the video track (achieves "tracking"), i.e., the head scanning path on the tape coincides with the video track.

A television video signal reproduced from a VTR contains time-base fluctuations due to mechanical fluctuation in the rotation of the rotary head and the tape transport speed. Such time-base fluctuation can be corrected by a digital time-base corrector (TBC). In a conventional digital TBC, as described in U.S. Pat. No. 3,909,839 entitled "PHASE LOCKING SYSTEM FOR TELEVISION SIGNALS USING DIGITAL MEMORY TECHNIQUES" issued to Inaba et al. and assigned to the present assignee, and in copending U.S. patent application Ser. No. 941,936 entitled "DIGITAL TIME-BASE CORRECTOR", issued July 22, 1980 as U.S. Pat. No. 4,214,262; by Mr. Mizukami, assignor to the present assignee, and one of the present joint inventors, a VTR-reproduced signal containing a time-base fluctuation is converted to a digital television video signal in response to a write-in clock pulse synchronized with a sync signal contained in the reproduced signal and the digital signal is stored in a digital memory. The stored digital television video signal is read out in response to a read-out clock pulse synchronized with a reference sync signal without time-base fluctuation, and is converted to an analog television video signal. Thus, a television video signal, containing a time-base fluctuation, is stored in response to a write-in clock pulse containing the fluctuation and is read out in response to a read-out pulse containing no fluctuation. The resultant read-out television video signal contains no time-base fluctuation.

Because the helical-scan VTR records the television video signal of one field on a single video track, the television signals recorded on two adjacent video tracks have very high correlation. Therefore, the helical-scan VTR, can produce a special-motion television video signal when the tape is transported at a reproducing tape speed, different from the normal tape speed, and the rotation of the rotary head is maintained at the recording rotational speed. The motion produced is proportional to the reproducing tape speed and, in this way, a special-motion reproduced television video signal, such as fast, slow and still-motion television video signals, can be generated.

Copending U.S. patent application Ser. No. 91,195 "VIDEO HEAD DEFLECTION APPARATUS FOR SPECIAL MOTION REPRODUCTION BY HELICAL SCAN VTR", issued Feb. 2, 1982 as U.S. Pat. No. 4,314,284, by Y. Sato and T. Konishi, assignors to the present assignee, of whom T. Konishi is one of the present joint inventors, proposes an improved special reproduction system wherein the rotary head is deflected in a direction vertical to the video track in response to reproducing tape velocity (tape speed and transporting direction). This method ensures that the head will follow a single video track during a single scanning even when the tape is transported at a speed different than normal speed. The rotary head is jumped by an amount equal to at least one video-track pitch in a vertical blanking period, as shown in FIGS. 4(1) through 4(10). The amount of additional head deflection (jump) is responsive to the reproducing tape velocity. In other words, in special-motion reproduction, the rotary head repeatedly scans the same video track (in still- or slow-motion reproduction) or skip-scans the video track (in the quick-motion reproduction). In special reproduction, before the rotary head completes scanning of a single video track, it is displaced to the position of another video track, thus causing a change in the number of horizontal scanning lines being reproduced.

The NTSC color television video signal has a sequence of four unique fields (4-field sequence) and interlace scanning is utilized. Thirty pictures are transmitted per second and a frame representing one picture consists of two fields, odd- and even-numbered, differing by one half of one horizontal scanning line with respect to the scanning position. The phase of the horizontal synchronizing signal for the odd field differs from that for the even field by half ($\frac{1}{2}$H) of one horizontal scanning period (1H). Further, the color sub-carrier frequency is determined to be 455/2 times the horizontal scanning frequency, and the number of horizontal scanning lines in one frame is 525. Therefore, the color sub-carrier phase of the first frame is reverse that of the second frame. This means that the video tracks, on which each NTSC color television video signal of one field is recorded, also include a 4 field sequence. In normal reproduction, therefore, the VTR reproduces a normal NTSC color television video signal having a 4 field sequence.

In special-motion reproduction, however, a VTR-reproduced television video signal never has a 4-field sequence because the rotary head performs repeat scanning (in still- and slow-motion reproduction) or skip scanning (in quick-motion reproduction). In still-motion reproduction, only the same television video signal of one field is repeatedly reproduced. In forward slow-motion reproduction, with a tape speed of 1/5 normal tape speed, the rotary head repeatedly scans a video track five times and then scans the following video track, whereby the same-field video signals are sequentially reproduced five fields by five fields. In forward quick-motion reproduction, with a tape speed twice as fast as normal speed, the rotary head scans every other video track, i.e., performs skip scanning, whereby the television video signal from odd, or even-numbered fields only is reproduced.

The VTR-reproduced television video signal is supplied to a digital TBC to compensate for time base error. In the digital TBC, the reproduced television video signal is digitized and written into a digital memory in response to a clock pulse train synchronized with the color sub-carrier of the reproduced television video signal. Information is read-out from the digital memory in response to timing of a normal NTSC color television signal having a 4-field sequence. In the case where repeat scanning is performed, in special-motion reproduction, the video signal written into the digital memory does not satisfy the interlace system. In contrast, read-out is achieved in interlace fashion. Although it looks like interlacing is performed on the read out video signal, in reality the same signal is repeatedly read out, and correspond to different places on the picture separated from the other field by $\frac{1}{2}$H. This gives a phase-shift to the read-out signal in that the vertical synchronizing signal is phase-shifted by $\frac{1}{2}$H. This further causes an oblique straight line on a recorded picture to be displayed in a stepwise or zigzag pattern on the read-out picture.

In the case where the same video signal of one field is repeatedly written into digital memory, the read-out sub-carrier phase is alternately in phase and out of phase with the write-in sub-carrier phase every frame. In other words, the phase difference between the write-in and read-out sub-carrier phases is changed every frame. This will cause another phase-shift in that the horizontal synchronizing signal is phase-shifted by one half (about 140 nanoseconds) of one cycle period of the color sub-carrier. These phase-shifts in the read-out signal cause visual shifts in the vertical or horizontal direction on the picture tube.

SUMMARY OF THE PRESENT INVENTION

It is, therefore, an object of this invention to provide a digital TBC for a special-motion reproduction system, in which a special-motion-reproduced color television video signal from a helical-scan VTR can be converted into a normal color television video signal having the normal number of horizontal scanning lines.

It is another object of this invention to provide a digital TBC for a special-motion reproduction system, in which a color television video signal, reproduced by repeat scanning or skip scanning, can be converted into a normal NTSC color television signal having a 4-field sequence.

In a digital TBC according to this invention, a special-motion-reproduced color television video signal from a helical-scan VTR is digitized in response to a clock pulse train synchronized with a color sub-carrier contained in the reproduced signal. The digitized video signal is written into a digital memory under the control of write-in address data including write-in line and point address data. The write-in line address data is latched at a time responsive to jump signals supplied from a helical-scan VTR. The latched data is transferred, at a time defined by a reference signal, to a read-out line address counter for generating read-out line address data. The stored video signal is read out under the control of read-out address data including the read-out line address data.

The read-out video signal is processed by a line interpolator and a chroma-inverter to obtain a properly interlaced video signal and a color-phase compensated video signal, respectively, thereby to provide a normal NTSC color television signal.

BRIEF DESCRIPTION OF THE DRAWING

Other features and advantages of this invention will be apparent from the following description of a preferred embodiment thereof taken in conjunction with the accompanying drawings, wherein:

FIG. 2 is a video track format of a tape on which a television video signal has been recorded by a helical-scan video tape recorder;

FIGS. 3 and 4(1) to 4(10) show head deflections in special-motion reproduction;

FIG. 5 is a block diagram of the digital TBC according to the embodiment shown in FIG. 1;

DETAILED DESCRIPTION OF THE INVENTION

Figure 1:
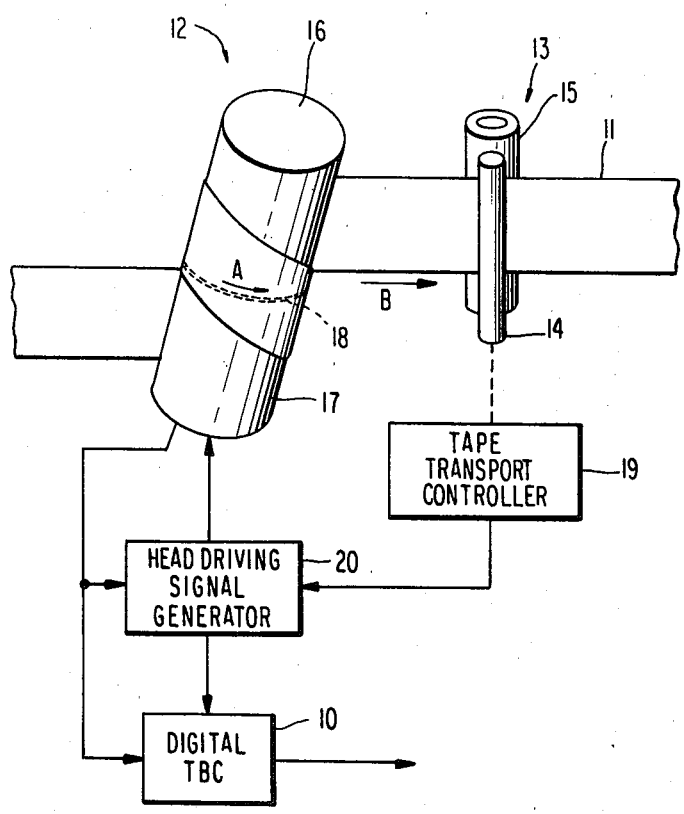
FIG. 1 shows an essential portion of a special-motion reproduction VTR together with a digital TBC according to an embodiment of this invention.

Referring to FIG. 1, a digital TBC 10 according to one embodiment of this invention is for use in a special-motion reproduction system accompanied by a helical-scan VTR. In the helical-scan VTR, a magnetic tape 11 is wrapped around a guide drum 12 and transported by tape transporting means 13 consisting of a capstan 14 and a pinch roller 15 in the direction of arrow B. The guide drum 12 has a pair of drum portions 16 and 17 between which is provided a rotary magnetic head 18 rotating in the direction of arrow A at a vertical scanning rate. The movement of the head forms a plurality of video tracks 11a, 11b, 11c and 11d, as shown in FIG. 2, each containing video information of one field. The video tracks are formed diagonally with respect to the longitudinal direction of tape 11. The actual magnetic tape also contains a plurality of other tracks (audio track, control track, and cue track) formed parallel to the lengthwise direction of the tape 11. These tracks form no part of the instant invention and accordingly are omitted for purposes of this description.

When the magnetic tape 11 is transported for play back at a speed equal to normal transport speed in the record mode, the rotary head 18 achieves perfect tracking of the video track. The center of the rotary head 18, which starts scanning at point P (FIG. 2) on the video track 11a, scans the track 11a while depicting the path following by the dashed line PQ and completes scanning at point Q on the same video track 11a. Since the magnetic tape 11 moves one pitch of video track in the period of one scanning, the rotary head 18 passes the point Q almost concurrently with the next rotary head (for a dual-head system) or the same head (for a single-head system) passing point R on the adjacent video track 11b. In the next scanning period, the rotary head 18 scans the video track 11b from point R to point S depicting the path shown by the dashed line RS. Thus, the magnetic head 18 achieves perfect tracking of the video track in normal tape transportation.

It is assumed that the tape is stopped under the control of a tape transport controller 19 (FIG. 1) and rotation of the rotary head 18 is maintained at the predetermined rate, i.e., at the vertical scanning rate. The rotary head 18, positioned at point R on the video track 11b at the beginning of scanning, will scan toward point Q on the video track 11a, ahead of the track 11b, while depicting the path shown by the long and short dashed line RQ. Since the magnetic tape 11 is stopped, the rotary head 18 repeatedly scans the same portion of the tape while depicting the path indicated by the long and short dashed line RQ. Therefore, the rotary head 18, when beginning scanning the center of track 11b at point R, gradually loses alignment with the track and shifts toward the adjacent track 11b until it begins to scan the center of the adjacent track at point Q. To achieve perfect tracking in the tape stop mode, the magnetic head, positioned at point R at the beginning of scanning, must scan toward point S. However, since points R and Q are equivalent points on the video track, it is necessary that the rotary head scanning the video track 11b be deflected to point Q from point T before it reaches point S.

Figure 3:
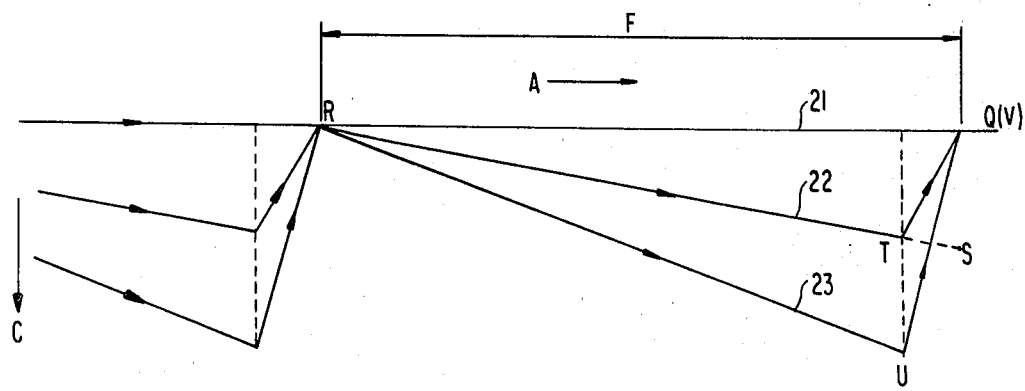

FIG. 3 illustrates the deflection of the rotary head 18 with reference to the plane of its rotation wherein arrow C indicates the vertical direction and the amount of head deflection. When the rotary head 18 is not deflected perpendicularly to the video track, the head depicts a plane of rotation 21, with the distance F between points R and Q being the rotating cycle of the head (one field), or stated more accurately, the cycle in which the head scans one video track.

Assuming that in the still reproduction mode, when the rotating head which started scanning at point R, accurately scans the video track 11b and returns to point Q via point T, the head 18 depicts a saw-toothed path 22 as indicated by R-T-Q in FIG. 3. In order to ensure that the head scans the video track accurately when the tape is transported in the reverse direction at normal speed, the head 18 must travel a saw-toothed path 23 R-U-V.

In slow or quick motion reproduction, in forward or reverse direction, the head 18 must travel paths of a complex shape that, as illustrated in FIG. 4, varies with the tape transport speed. FIG. 4(4) shows head deflection in the case of normal reproduction in which the tape 11 is transported in the direction B at normal tape speed $S_N$, and corresponds to the path 21 in FIG. 3. In this case, as understood from FIG. 4(4), the rotary head 18 is not deflected.

FIGS. 4(8) and 4(10) correspond respectively to the paths 22 and 23, i.e., show head deflection in the cases of the tape-stop mode and reverse reproduction at normal speed $S_N$.

FIGS. 4(1), 4(2) and 4(3) illustrate head deflection in the cases of forward quick motion reproduction at tape speeds of $2S_N$, $1.5S_N$ and $1.2S_N$, respectively. FIGS. 4(5), 4(6) and 4(7) illustrate the cases of forward slow motion reproduction at tape speeds of $0.8S_N$, $0.5S_N$ and $0.2S_N$, respectively, and FIGS. 4(9) and 4(10) illustrate the cases of reverse reproduction at tape speeds of $0.2S_N$ and $S_N$, respectively.

As the rotary head 18 jumps from the apex of each of these saw-toothed paths (e.g. points T and U) to point Q or V, it will not of course trace the video track. Therefore, the head desirably accomplishes such jump movement within the vertical blanking period for the recorded video signal. In still reproduction, as understood from FIG. 4(8), the rotary head 18 jumps by an amount equal to one video-track pitch, i.e., performs a one-track jump once a field period. In forward slow-motion reproduction, as shown in FIGS. 4(5), 4(6) and 4(7), the rotary head 18 performs a one-track jump with a frequency responsive to the tape speed. In reverse slow-motion reproduction, as shown in FIG. 4(9), the rotary head 18 performs not only the one-track jump but also a two-track jump by which rotary head 18 jumps by an amount equal to two video-track pitches. In reverse reproduction, as shown in FIG. 4(10), the rotary head 18 performs a two-track jump once a field period.

In forward quick-motion reproduction, as understood from FIGS. 4(1), 4(2) and 4(3), the rotary head 18 deflects in direction reverse to the deflecting direction in other cases shown in FIGS. 4(5) to 4(10). The rotary head 18 also jumps by an amount equal to one track pitch in a direction reverse to the direction jumped in other cases, i.e., performs a skip jump, whereby the rotary head 18 scans the video tracks and skips tracks adjacent to those already scanned.

In still reproduction, the rotary head scans the tape from point R to point T, while scanning from point R to point S in normal reproduction. Therefore, the scanning length during one scanning in still reproduction is shorter than that in normal reproduction by the difference between the horizontal scanning periods of adjacent video tracks (2.5H in FIG. 2). When the tape is transported in the reverse direction at the normal tape speed, the rotary head scans from point R to point U, whereby the scanning length is shorter than that in normal reproduction by 5H. Conversely, when the rotary head scans the tape from point R to point W with the tape running twice as fast as normal speed, the scanning length is longer by 2.5H than that in normal reproduction. The actual tape recorded by a VTR is also designed so that adjacent video tracks are spaced from each other by 2.5H. Since the rotary head keeps revolving at a constant speed, the four periods of scanning, i.e., from point P to point Q (in normal mode), from point R via point T to point Q (in stop mode), from point R via point U to point V (in reverse mode), and from point R via point W to point X (in twice speed mode), are equal. Therefore, such change in scanning length causes a change in the number of horizontal synchronizing lines, or the number of horizontal synchronizing periods as reproduced in single scanning (in the period of one field).

Head deflection and head jumps are driven by a head driving signal supplied from a driving signal generator 20 (FIG. 1) identical to the signal generator 9 in FIG. 1 of the above-mentioned U.S. Pat. No. 4,314,284. Because the saw-toothed path shown in FIG. 4 is computer-programable, on the basis of the tape velocity of which it is a function, the driving signal generator 20 may be comprised of a micro-computer, to which the vertical synchronizing signal component in the reproduced video signal is supplied to determine the timing of the head jump. The driving signal generator 20 further produces jump signals (one-track, two-track and skip jump signals) when the corresponding head jumps are necessitated.

Referring to FIG. 5 which illustrates a digital TBC 10 in accordance with the instant invention, an input terminal 30 is supplied with a television video signal reproduced in the special reproduction mode by the helical VTR. From the terminal 30, the television video signal is supplied to an analog/digital converter (ADC) 31, a burst separator 32 and a sync separator 33. The burst separator 32 is also supplied with a horizontal sync signal separated at the sync separator 33. The burst separator 32 generates a color burst signal from the input television video signal using the horizontal sync signal as a reference.

The color burst signal is supplied to a write-in clock pulse generator 34, which generates a write-in clock pulse train having a frequency of 14.32 MHz (3.58 MHz×4). The write-in clock pulse train is supplied to the ADC 31, which converts the input television video signal to, for example, an 8-bit time-parallel PCM video signal.

The write-in clock pulse train is supplied to a write-in address data generator 35 which is also supplied with the synchronizing signal from the sync separator 33. The write-in address data generator 35 generates write-in address data including write-in line address data and write-in point address data. The write-in address data is supplied to a digital memory 37 through a write-in/read-out controller 36. The digital memory 37 is also supplied with the PCM video signal from the ADC 31, and the PCM video signal is stored at an address designated by the write-in address data.

A read-out sub-carrier is supplied from a terminal 38 to a read-out clock pulse generator 39, which generates a read-out clock pulse having a frequency of 14.32 MHz. The read-out clock pulse is supplied to a read-out address data generator 40 which is also supplied with a read-out horizontal sync signal and vertical sync signal from a terminal 41. The read-out address data generator 40 supplies read-out address data, including read-out line address data and read-out point address data, to the digital memory 37 through the write-in/read-out controller 36. Depending upon the read-out address data, a PCM video signal is read out from the digital memory 37 and supplied to a processor 42. The processor 42 performs the phase-inversion of the carrier chrominance signal component and/or the line interpolation in response to the control signals supplied from a controller 44. The processed PCM video signal is supplied to a digital/analog converter (DAC) 43. The DAC 43, which is supplied with the read-out clock pulse from the read-out clock pulse generator 39, converts the PCM video signal to an analog video signal.

The controller 44 latches the write-in line address data supplied from the write-in address data generator 35 at a time responsive to the jump signals supplied from the driving signal generator 20 (FIG. 1). The latched data is transferred to a read-out line address counter in the read-out address data generator 40 to provide reset data at a time responsive to the reference sync signal.

Figure 6:
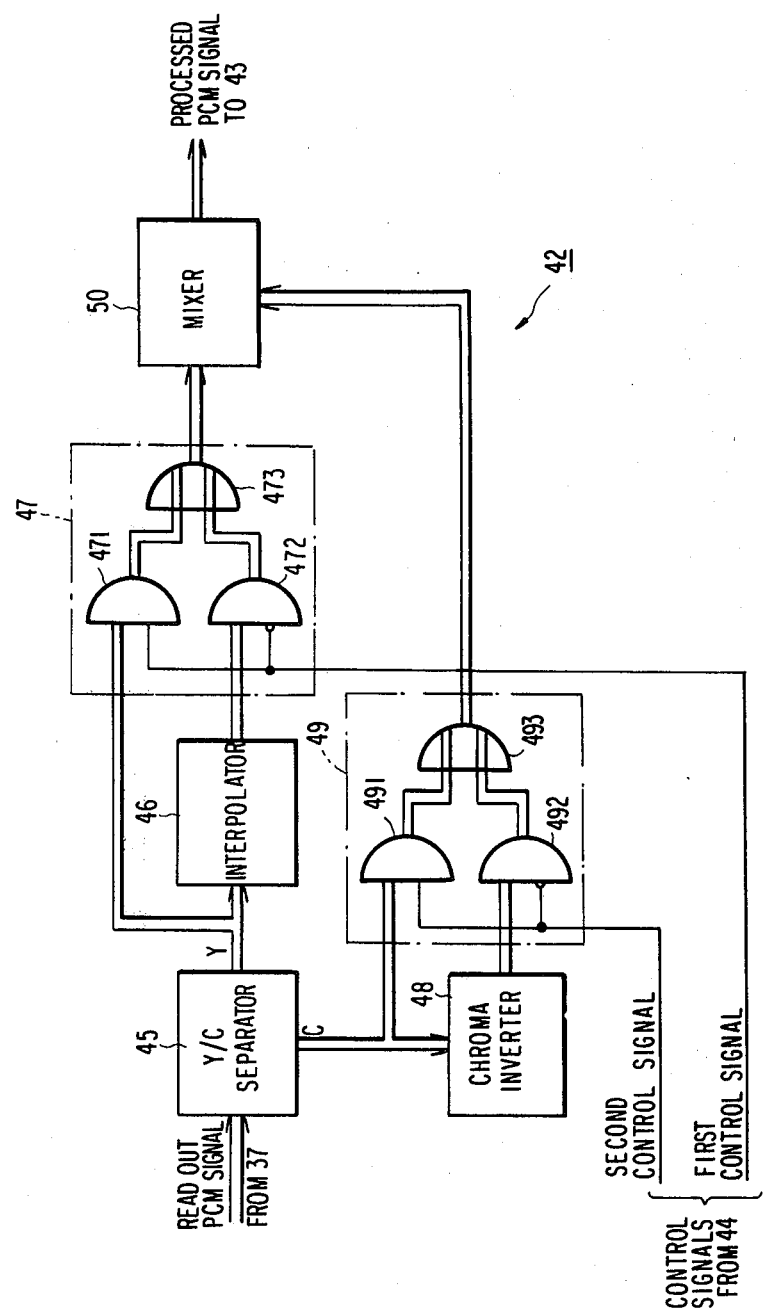
FIG. 6 is a block diagram of a signal processor 42 used in the digital TBC shown in FIG. 5.

Referring to FIG. 6, the processor 42 is comprised of a luminance/chrominance (Y/C) separator 45 for producing, from the read-out PCM video signal, a luminance (Y) signal component and a carrier chrominance (C) signal component. The Y signal component is supplied to a line interpolator 46 for producing an interpolated Y signal component. As disclosed in copending U.S. patent application Ser. No. 39,287 "LUMINANCE/CHROMINANCE SEPARATING APPARATUS HAVING A SPATIAL FILTERING EFFECT", issued Aug. 19, 1980 as U.S. Pat. No. 4,218,700, by Kazuo Kashigi, assignor to the present assignee, the Y/C separator 45 may be composed of 1H delay means and comb filter means and the interpolator 46 may be composed of 1H delay means, attenuator means and adder means.

The Y signal component from the Y/C separator 45 and the interpolated Y signal component from the interpolator 46 are supplied to a first switch 47 comprised of an AND gate 471, an inhibit gate 472 and an OR gate 473. The switch 47 produces a field-compensated Y signal in response to a first control signal supplied from the controller 44.

The C signal component is supplied from the Y/C separator 45 to a chroma inverter 48 for phase-inverting the C signal component. The non-inverted and phase-inverted C signal components are supplied from the Y/C separator 45 and the chroma-inverter 48 to a second switch 49. The second switching device 49 is composed of a AND gate 491, an inhibit gate 492 and a OR gate 493, and produces a color-phase-compensated C signal in response to a second control signal supplied from the controller 44.

The color-phase-compensated C signal is supplied to a mixer 50, which is also supplied with the field-compensated Y signal from the first switching device 47. The mixer 50 produces a normal NTSC color television video signal having the 4 field sequence. The normal NTSC color television video signal is supplied to the DAC 43 (FIG. 5).

Figure 7:
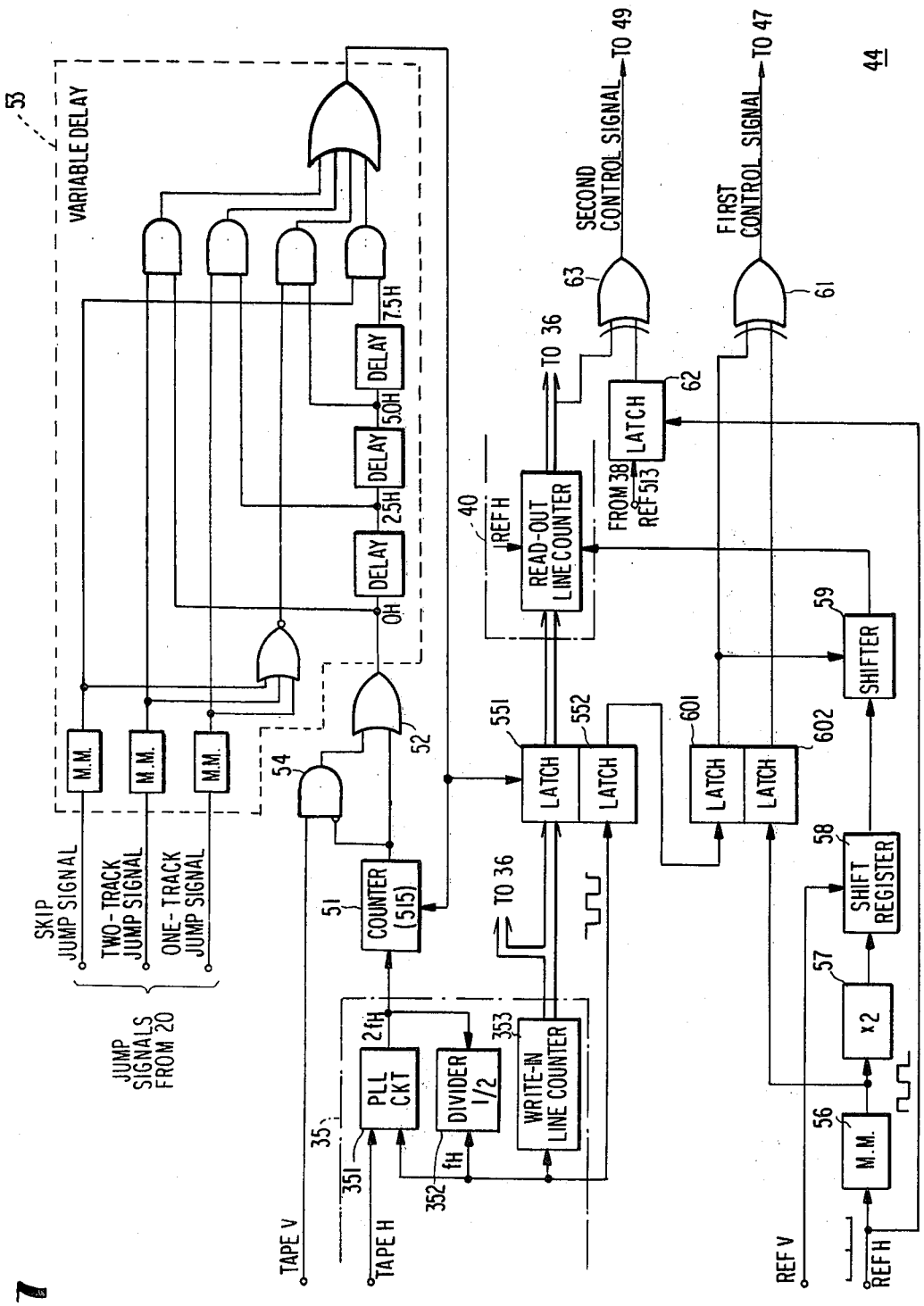
FIG. 7 shows a block diagram of a controller 44 together with related portions of a write-in address data generator 35 and a read-out address data generator 40 used in the digital TBC shown in FIG. 5.

Referring to FIG. 7, the reproduced horizontal sync signal (TAPE H signal) is supplied from the sync separator 33 to a PLL (Phase Locked Loop) circuit 351 in the write-in address data generator 35. The PLL circuit 351 is comprised of a phase comparator and a voltage-controlled oscillator and generates an oscillation signal having a frequency (2fH) twice the horizontal scanning frequency fH. The oscillation signal is supplied to a ½ divider 352 composed of a flip-flop circuit to produce a symmetrical square wave signal of the horizontal scanning frequency fH. The square wave signal of fH is fed back to the phase comparator in the PLL circuit 351 and phase-compared with the TAPE H signal, thereby to provide the oscillation signal of 2fH and the square wave signal of fH phase-locked to the TAPE H signal. The PLL circuit 351 has a time constant greater than the horizontal scanning period (1H), whereby no drop out occurs in the oscillation signal even when the TAPE H signal is dropped out.

The square wave signal of fH is supplied to a write-in line address counter 353 as a clocking pulse. The write-in line address counter 353 generates the write-in line address data, which is supplied through the write-in/read-out controller 36 to the digital memory 37 as a part of the write-in address data.

The oscillation signal of 2 fH is supplied to a counter 51, which generates an output pulse when a counted content reaches 515. The counted content of 515 by the oscillation signal of 2fH corresponds to a time period equal to 257.5H. The output pulse from the counter 51 is supplied through an OR circuit 52 to a variable delay circuit 53, which is supplied as delay control signal with the jump signals (one-track jump signal, two-track jump signal and skip-jump signal) from the head driving signal generator 20 (FIG. 1).

The variable delay circuit 53 delays the output signal by a time period responsive to the jump signals supplied thereto. When no jump signal is supplied as in the case of normal reproduction, the delay time is to be selected to 5H. When one-track, two-track and skip jump signals are supplied, the pulse is delayed by 2.5H, 0H, and 7.5H, respectively. The delayed pulse from the variable delay circuit 53 is supplied to a reset terminal of the counter 51 to reset the content to zero.

The variable delay circuit 53 may be comprised of, for example, as illustrated in FIG. 7, three monostable multivibrators receiving the respective jump signals, a NOR circuit receiving outputs from the monostable multivibrators, three delay lines connected in tandem and each having a delay time of 2.5H, four AND circuits each receiving at one input terminal 0H, 2.5H, 5H, or 7.5H-delayed signal and at the other terminal output of each monostable multivibrator or the NOR circuit, and an OR circuit receiving the outputs from the AND circuits.

The reproduced vertical sync signal (TAPE V signal) from the sync separator 33 is supplied to an inhibit circuit 54, which is supplied at an inhibit terminal with the output pulse from the counter 51. When no pulse is produced from the counter 51, i.e., at a starting of operation, the TAPE V signal is passed through the inhibit circuit 54 and the OR circuit 52 to the variable delay circuit 53. Then, the delayed pulse from the variable delay circuit 53 is supplied to the counter 51 to reset, whereby the output pulse from the counter 51 can be synchronized with the TAPE V signal in normal reproduction. As the result, the TAPE V signal is not passed through the inhibit circuit 54, unless the phase of the TAPE V is changed, and the output pulse can be obtained from the OR circuit 52 in synchronism with the vertical sync signal even when no TAPE V signal is supplied thereto.

In the variable delay circuit 53, the difference −5H between the delay times 5H and 0H for the no jump signal and two-track jump signal as well as the differences −2.5H between those for no jump and one-track jump and +2.5H between those for no jump and skip jump correspond respectively to the differences between the horizontal scanning periods of the two video tracks, from one to other of which the head is jumped.

This means that the delayed pulse derived from the variable delay circuit 53 represents a starting phase of the picture to be reproduced in the next scanning period. The delayed pulse is supplied to latch circuits 551 and 552 as a timing signal. The latch circuits 551 and 552 latch the write-in line address data and the square wave signal supplied respectively from the write-in line address counter 353 and the divider 352 in the write-in address data generator 35.

The reference horizontal sync signal (REF H signal) from the terminal 41 is supplied to a monostable multivibrator 56 to provide a symmetrical square wave signal of fH. The square wave signal is supplied to a doubler circuit 57 to produce a signal of 2 fH, which is then applied as a clock pulse to a shift register 58 for delaying the reference vertical sync signal (REF V signal). The delayed REF V signal is supplied through a shift circuit 59 to a read-out line address counter 401 in the read-out address data generator 40. When the delayed REF V signal is applied, the line address data in the latch circuit 551 is transferred to the read-out line address counter 401, and thereby the read-out line address coincides with the write-in line address immediately after the generation of the delayed pulse responsive to the jump signals. This means that the phase at write-in side to that at read-out side is fixed at starting of scanning of the picture. Therefore, the stable television video signal can be obtained even in special-motion reproduction.

The delay time in the shift register 58 is selected so that when the latched data in the latch circuit 551 is transferred to the read-out line address counter 401, the read-out address is positioned at substantial center of the time-base correction range with respect to the write-in address data.

The latched content in the latch circuit 552 represents field identification (odd- or even-numbered field) at the write-in side, i.e., a write-in field indent signal. The write-in field indent signal is latched in a latch circuit 601 in response to the delayed REF V signal. Similarly, a read-out field indent signal can be obtained by latching the square wave signal from the monostable multivibrator 56 in a latch circuit 602 in response to the delayed REF V signal.

The write-in field indent signal latched in the latch circuit 601 is supplied to the shift circuit 59 and controls a shift or non-shift of the delayed REF V signal by a half H. The write-in and read-out field indent signals in the latch circuits 601 and 602 are supplied to an exclusive-OR circuit 61 to provide the first control signal, which is to be supplied to the first switch 47 (FIG. 6) for controlling the line interpolation.

The REF H signal is also supplied to a latch circuit 62 and latches the reference sub-carrier signal supplied from the terminal 38 to produce a reference line flip-flop signal (REF FF signal) having a frequency of ½fH. The REF FF signal is supplied to an exclusive-OR circuit 63, which is supplied as a TAPE FF signal with one bit in the read-out line address data having a frequency of ½fH. The exclusive-OR circuit 63 provides the second control signal which is to be supplied to the second switch 49 (FIG. 6) for controlling the chroma inversion.

What is claimed is:

1. A time-base corrector for correcting time-base errors in a television video signal reproduced by a rotary magnetic head in a helical-scan video tape reproducer from a magnetic tape on which a plurality of video tracks are formed diagonally with respect to the longitudinal direction of said tape, a television video signal of one or more fields being recorded on each of said video tracks, said tape being able to be transported at a reproducing tape speed different from a normal tape speed at which said television video signal is recorded on said tape, said rotary magnetic head being deflected in a direction perpendicular to said video tracks so that said magnetic head follows a single video track during a single scanning at said reproducing tape speed, said magnetic head jumping in a direction perpendicular to said video tracks by an amount equal to at least one video-track pitch, said helical-scan video tape reproducer providing jump signals representing the direction and amount of the jump of said magnetic head, said time-base corrector comprising:

(a) means for generating a first clock pulse in synchronism with said television video signal;
(b) means responsive to said first clock pulse for converting said television video signal to a digital video signal;
(c) digital memory means for storing said digital video signal;
(d) means for generating write-in address data, in response to (i) said first clock pulse, (ii) a first horizontal sync signal and (iii) a first vertical sync signal, said write-in address data designating an address at which said digital video signal is to be written into said digital memory, said write-in address data including write-in line address data and write-in point address data;
(e) means responsive to said jump signals for latching said write-in line address data into latch means at a time controlled by said jump signals;
(f) means for generating a second clock pulse in a synchronism with a reference signals;
(g) means for generating read-out address data, in response to (i) said second clock pulse, (ii) a second horizontal sync signal, and (iii) a second vertical sync signal, said read-out address data designating an address at which the stored digital video signal is read out from said digital memory means, said read-out address data including read-out line address data and read-out point address data;
(h) means responsive to said second vertical sync signal for transferring the latched data from said latching means to said read-out address data generating means as read-out line address data, the time of transferring said latched data being defined by said second vertical sync signal; and
(i) means responsive to said second clock pulse for converting said read-out digital video signal into an analog video signal.

2. A time-base corrector for correcting time-base errors in a television video signal reproduced by a rotary magnetic head in a helical-scan video tape reproducer from a magnetic tape on which a plurality of video tracks are formed diagonally with respect to the longitudinal direction of said tape, a television video signal of one or more fields being recorded on each of said video tracks, said tape being able to be transported at a reproducing tape speed different from a normal tape speed at which said television video signal is recorded on said tape, said rotary magnetic head being deflected in a direction perpendicular to said video tracks so that said magnetic head follows a single video track during single scanning at said reproducing tape speed, said magnetic ead jumping in a direction perpendicular to said video tracks by an amount equal to at least one video-track pitch, said helical-scan video tape reproducer providing jump signals representing the direction and amount of the jump of said magnetic head, said time-base corrector comprising:

(a) means for generating a first clock pulse in synchronism with said television video signal;
(b) means responsive to said first clock pulse for converting said television video signal to a digital video signal;
(c) digital memory means for storing said digital video signal;
(d) means for generating write-in address data in resoonse to (i) said first clock pulse, (ii) a first horizontal sync signal and (iii) a first vertical sync signal, said write-in address data designating an address at which said digital video signal is to be written into said digital memory, said write-in address data including write-in line address data and write-in point address data, said means for generating said write-in address data comprising phase-locked means receiving said first horizontal sync signal to produce first and second stable signals at frequencies substantially equal to and twice that of said first horizontal sync signal, respectively, and first counter means receiving said first stable signal to provide write-in line addresses for said digital memory means:
(e) means responsive to said jump signals for latching said write-in line address data into latch means at a time controlled by said jump signals:
(f) means for generating a second clock pulse in a synchronism with a reference signal;
(g) means for generating read-out address data, in response to (i) said second clock pulse, (ii) a second horizontal sync signal, and (iii) a second vertical sync signal, said read-out address data designating an address at which the stored digital video signal is read out from said digital memory means, said read-out address data including read-out line address data and read-out point address data;
(h) means responsive to said second vertical sync signal for transferring the latched data from said latching means to said read-out address data generating means as read-out line address data, the time of transferring said latched data being defined by said second vertical sync signal; and
(i) means responsive to said second clock pulse for converting said read-out digital video signal into an analog video signal.

3. The time-base corrector of claim 2 further comprising second counter means receiving said second stable signal and providing an enabling signal to said means responsive to said jump signals when said second stable signal counts through approximately, but slightly less than, one-half of a full interlaced scan of said television video signal.

4. A time-base corrector for correcting time-base errors in television video signal reproduced by a rotary magnetic head in helical-scan video tape reproducer from a manetic tape on which plurality of video tracks are formed diagonally with respect to the longitudinal direction of said tape, a television video signal of one or more fields being recorded on each of said video tracks, said tape being able to be transported at a reproducing tape speed different from a normal tape speed at which said television video signal is recorded on said tape, said rotary magnetic head being deflected in a direction perpendicular to said video tracks so that said magnetic head follows a single video track during a single scanning at said reproducing tape speed, said magnetic head jumping in a direction perpendicular to said video tracks by an amount equal to at least one video-track pitch, said helical-scan video tape reproducer providing jump signals representing the direction and amount of the jump of said magnetic head, said time-base corrector comprising:

(a) means for generating a first clock pulse in synchronism with said television video signal:

(b) means responsive to said first clock pulse for converting said television video signal to a digital video signal:

(c) digital memory means for storing said digital video signal;

(d) means for generating write-in address data in response to (i) said first clock pulse, (ii) a first horizontal sync signal and (iii) a first vertical sync signal, said write-in address data designating an address at which said digital video signal is to be written into said digital memory, said write-in address data including write-in line address data and write-in point address data:

(e) means responsive to said jump signals for latching said write-in address data into latch means at a time controlled by said jump signals, said means responsive to said jump signals comprising variable delay means providing a delay as a function of said reoroducing tape speed;

(f) means for generating a second clock pulse in a synchronism with a reference signal;

(g) means for generating read-out address data, in response to (i) said second clock pulse, (ii) a second horizontal sync signal, and (iii) a second vertical sync signal, said read-out address data designating an address at which the stored digital video signal is read out from said digital memory means, said read-out address data including read-out line address data and read-out point address data;

(h) means responsive to said second vertical sync signal for transferring the latched data from said latching means to said read-out address data generating means as readout address data, the time of transferring said latched data being defined by said second vertical sync signal; and (i) means responsive to said second clock pulse for converting said read-out digital video signal into an analog video signal.

5. The time-base corrector of claim 4 wherein said variable delay means comprises at least one delay device receiving a timing output from said means for generating said write-in address data to provide variable delay outputs prior to and after said delay device, first and second AND gates each receiving a single associated one of said variable delay outputs at first inputs thereof, individual ones of said jump signals being applied to an associated AND gate at second inputs thereof, said first and second AND gates providing outputs to said latch means.

6. A time-base corrector for correcting time-base errors in a television video signal reproduced by a rotary magnetic head in a helical-scan video tape reproducer from a magnetic tape on which a plurality of video tracks are formed diagonally with respect to the longitudinal direction of said tape, a television video signal of one or more fields being recorded on each of said video tracks, said tape being able to be transported at a reproducing tape speed different from a normal tape speed at which said television video signal is recorded on said tape, said rotary magnetic head being deflected in a direction perpendicular to said video tracks so that said magnetic head follows a single video rack during a single scanning at said reproducing tape speed, said magnetic head jumping in a direction perpendicular to said video tracks by an amount equal to at least one video-track pitch, said helical-scan video tape reproducer providing jump signals representing the direction and amount of the jump of said magnetic head, said time-base corrector comprising:

(a) means for generating a first clock pulse in synchronism with said television video signal;

(b) means responsive to said first clock pulse for converting said television video signal to a digital video signal;

(c) digital memory means for storing said digital video signal;

(d) means for generating write-in address data in response to (i) said first clock pulse, (ii) a first horizontal sync signal and (iii) a first vertical sync signal, said write-in address data designating an address at which said digital video signal is to be written into said digital memory, said write-in address data including write-in line address data and write-in point address data;

(e) means responsive to said jump signals for latching said write-in line address data into latch means at a time controlled by said jump signals;

(f) means for generating a second clock pulse in a synchronism with a reference signal;

(g) means for generating read-out address data, in response to (i) said second clock pulse, (ii) a second horizontal sync signal, and (iii) a second vertical sync signal, said read-out address data designating an address at which the stored digital video signal is read out from said digital memory means, said read-out address data including read-out line address data and read-out point address data:

(h) means responsive to said second vertical sync signal for transferring the latched data from said latching means to said read-out address data generating means as read-out line address data, the time of transferring said latched data being defined by said second vertical sync signal, said means responsive to said second vertical sync signal comprising shift register means receiving said second vertical sync signal and being clocked by a signal related to said second horizontal sync sgnal, said shift register means providing an enable signal to said read-out address data generating means in response to said vertical sync signal and said signal related such that the read-out address from said means for generating said read out address at said time of transferring said latched data is substantially positioned at the center of the time base correction range with respect to said write-in address data; and (i) means responsive to said second clock pulse for converting said read-out digital video signal into an analog video signal.

7. The time-base corrector of claim 6 wherein said means responsive to said vertical sync further comprises frequency doubling means receiving said second horizontal synch signal to provide said related signal, and shift means for selectively shifting said enable signal by one-half of the period of said horizontal sync signal depending upon whether the field of said television video signal presently being processed is odd or even.

* * * * *

UNITED STATES PATENT AND TRADEMARK OFFICE
CERTIFICATE OF CORRECTION

PATENT NO. : 4,389,678
DATED : June 21, 1983
INVENTOR(S) : Mineo Mizukami et al

It is certified that error appears in the above-identified patent and that said Letters Patent is hereby corrected as shown below:

Column 1, line 36, "one" should be --end--.

lines 36-37, "portions" should be --portion--.

Column 11, line 67, "ead" should be --head--.

Column 12, line 13, "resoonse" should be --response--.

line 60, "manetic" should be --magnetic--.

Column 13, line 27, "reoro" should be --repro--.

Column 14, line 48, "sgnal" should be --signal--.

line 64, "synch" should be --sync--.

Signed and Sealed this

Twentieth Day of March 1984

[SEAL]

Attest:

GERALD J. MOSSINGHOFF

Attesting Officer      Commissioner of Patents and Trademarks